March 20, 1934.   T. ZUSCHLAG   1,951,387
ELECTRICAL PROSPECTING
Filed Oct. 1, 1930   2 Sheets-Sheet 2

INVENTOR
THEODOR ZUSCHLAG
BY
ATTORNEYS

Patented Mar. 20, 1934

1,951,387

UNITED STATES PATENT OFFICE 1,951,387

ELECTRICAL PROSPECTING

Theodor Zuschlag, New York, N. Y., assignor to Swedish American Prospecting Corporation, New York, N. Y., a corporation of New York Application October 1, 1930, Serial No. 485,639

24 Claims. (Cl. 175—182)

This invention relates to electrical prospecting and has for its object certain improvements in the apparatus for electrical prospecting. The invention relates more particularly to an improved apparatus that may be employed for determining and comparing electric potentials or electromagnetic field strengths, such as are encountered when investigating artificial electric ground fields set up for the purpose of making geo-physical explorations on the earth's surface and the like.

Artificial ground fields may be produced in areas or tracts to be investigated by direct current or alternating current excitation. When direct current is used, the investigation of the ground field need be made only in respect to its potential or field strength. When alternating current is used, on the other hand, an investigation to be complete must in addition include also a determination of the time or phase relation between the exciter field, set up to induce the ground field, and the ground field itself. This is the reason why methods and apparatus heretofore designed for direct current exploration cannot generally be used for alternating current exploration, especially if a neutralizing or compensating principle is involved; which appears highly necessary in order to obtain optimum results. Even with respect to methods and apparatus heretofore proposed for direct or alternating current exploration, serious difficulties exist that complicate the analysis of the resultant readings. These difficulties concern the elimination of resistances that are not necessary for the final analysis, as for instance ground contact resistances, or internal instrument resistances, the values of which vary for different settings of the apparatus employed.

As a result of my investigations I have determined that these difficulties may be substantially overcome by the use of a novel apparatus for conducting the geophysical exploration. The apparatus permits the determination of potential drop, or electromagnetic field strength, ratios, and eliminates by the same operation substantially all unnecessary or interfering ground contact, or internal instrument, resistances.

In general, the apparatus of the present invention is employed to create an artificial electric or electromagnetic ground field in a tract of land and to determine the ratio between the electric potentials or the electromagnetic field strengths created by such ground field at spaced points in the tract. In accordance with the invention, this determination of the ratio between the potentials or electromagnetic field strengths is carried out in such a manner as to eliminate the resistance of ground electrodes, or other pick-up means, changes in the strength of the ground field or variations in the resistance of the instruments employed, etc.

The potential or field strength ratios are conveniently determined from the flow of current produced in a conductive net-work including suitable variable resistances and inductances and current responsive means, the potentials or field strengths at the points under investigation being impressed on the net-work through suitable pick-up means, such as electrodes conductively grounded in the tract, or receiving coils inductively associated with the tract.

The above mentioned resistances are eliminated by making two separate determinations of the potential or field strength ratios for each setting of the pick-up means, and by altering known variable resistances in the net-work, to give a different value of current therethrough for each of these determinations. When the potential or field strength ratios are calculated from the data obtained by these two determinations, factors such as ground electrode resistance, receiving coil impedance, instrument resistance, and ground field variation may be eliminated and an accurate derivation of the desired ratios obtained. Since the ground resistances, receiving coil impedance, instrument resistance and ground field strength do not always remain constant at different locations of the pick-up means, the elimination of these factors from the ratio determinations is essential if the results obtained at different settings are to be properly correlated and relatively analyzed.

In the practice of the present invention, spaced exciter or power electrodes connected to a source of current supply are suitably grounded in a tract to be investigated. The power electrodes may be spaced several hundred or thousand feet apart. The source of current supply may be either an alternating or a direct current generator. This field excitation arrangement is adapted to set up a ground field in the tract.

A conductive net-work is used in conjunction with the excitation arrangement, which is provided with suitable pick-up means to be placed and spaced within a ground field caused by the field excitation. The pick-up means may consist of potential electrodes, or receiving coils. These pick-up means are suitably spaced from one another and from one of the power electrodes, so that a current derived from the ground field is made to flow through the conductive net-work.

According to the present invention, in the case of the use of potential electrodes, three potential electrodes, or their equivalents, are grounded, preferably in a straight line, within the influence of one of the power electrodes. The center potential electrode is so placed that it will have a potential drop higher or lower than the two end potential electrodes. In order to provide a higher potential drop for the center electrode, the electrode in question may be spaced nearest to the power electrode.

On the other hand, the conductive characteristics of the tract or portions of the tract to be investigated may be such that the center potential electrode may have a higher potential drop than either of the two end electrodes, although one of the end electrodes is placed nearer to the power electrode.

As will be more fully shown below, the object of providing the center potential electrode with a potential drop higher than that of the two end electrodes is to make certain that current flows through the center electrode to the end electrodes; or, in case the center potential electrode has a potential drop lower than that of the two end potential electrodes, that current will flow from the end electrodes to the center electrode. In each case current flows through the net-work in opposite directions.

It will thus be seen that the center potential electrode is merely one of reference, the aim being to obtain potential drop variations at the end electrodes. Such potential drop variations may be calculated from the data obtainable in the practice of the invention.

An artificial potential drop may be substituted for the center electrode, or for one of the end electrodes; by the use of special means to be discussed below. These artificial potential drops may be obtained by various combinations, and are highly useful in making certain investigations.

In case induction coils are employed as pick-up means in the conductive net-work, one of them must be placed in opposition to the other so that current induced in the coils from the ground field may flow in opposite directions. To that extent the use of receiving coils is substantially similar to that of potential electrodes.

The present invention will undoubtedly be better understood if reference is made to the accompanying drawings, taken in conjunction with the following description, in which.

Figure 1:
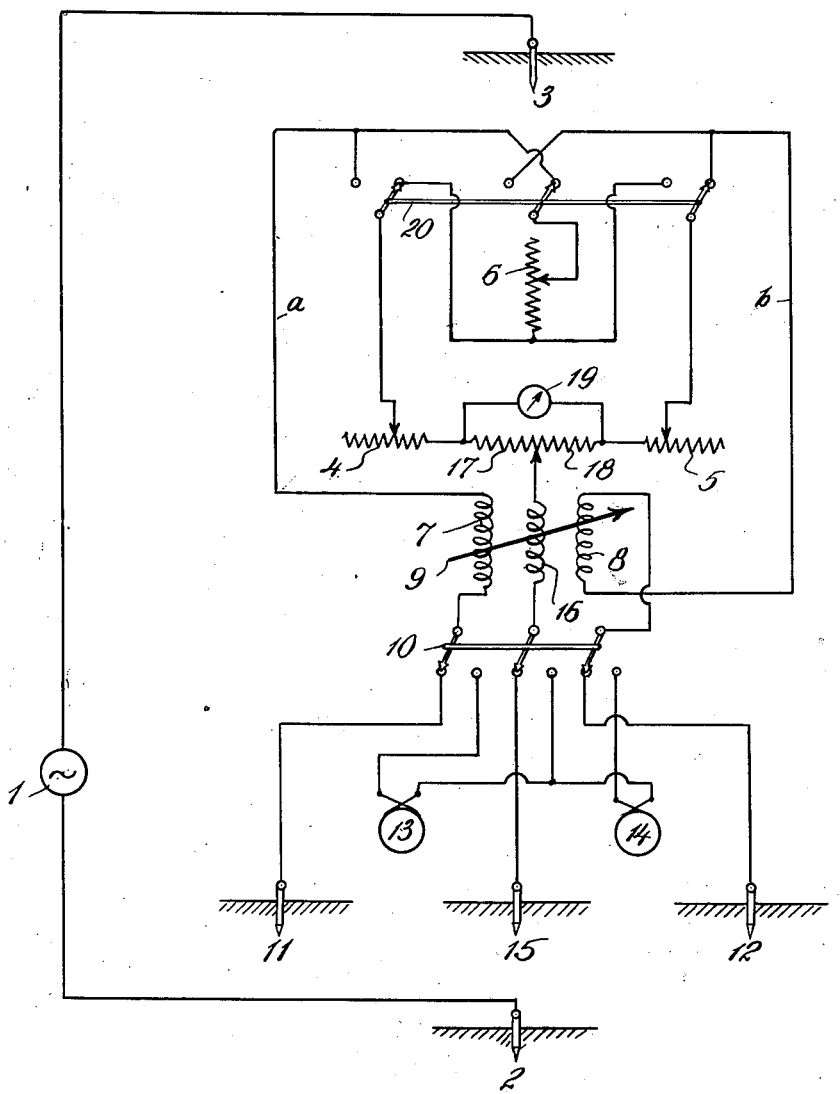
Fig. 1 is a diagrammatic representation of apparatus adapted for the practice of the invention.

Referring to Fig. 1, an alternating current source 1 is connected to grounded power or exciter electrodes 2 and 3, which electrodes may be separated several hundred or thousand feet. This arrangement is adapted to set up the necessary ground field, in a tract to be investigated.

The field excitation arrangement is used in conjunction with a compensating or neutralizing net-work consisting of non-inductive variable resistances 4, 5 and 6 connected in series with each other and with stators 7 and 8 of a variometer 9. The stators are in reverse position to one another. The free ends of the stators are connected by means of a triple-pole double-throw switch 10 either to spaced and grounded potential electrodes 11 and 12, or to the free ends of pick-up coils 13 and 14,—consisting of the same number of turns of insulated copper wire. One of the coils must be oppositely arranged to the other coil in order that currents induced in the coils may be made to flow in opposite directions.

The triple-pole double-throw switch further connects with a center potential electrode 15, or the common ends of the pick-up coils, to the rotor 16 of the variometer. The rotor is connected in series to a common point of two oppositely extending electrically identical resistances 17 and 18. The electrically identical resistances are bridged by a current responsive means, indicating device, zero current indicator, galvanometer or telephone 19. These two resistances are each further connected, respectively, in series to the non-inductive variable resistances 4 and 5.

The sliding contact arms of the resistances 4 and 5 are connected to a triple-pole double-throw switch 20, which permits a connection of the variable resistance 6 in series with resistance 4 and stator 7 to end electrode 11; or with resistance 5 and the reversed stator 8 to the end potential electrode 12.

It will be noted that the net-work employed comprises two parallel circuits $a$ and $b$; the circuit $a$ including the variable resistance 4; and the circuit $b$ including the variable resistance 5. The current responsive device 19 is included in the branch common to the two circuits, and the resistance 6 may be included in either of the circuits, depending upon the position of the switch 20. The resistance 6 is essentially an auxiliary resistance to increase resistance 4 or 5.

Figure 2:
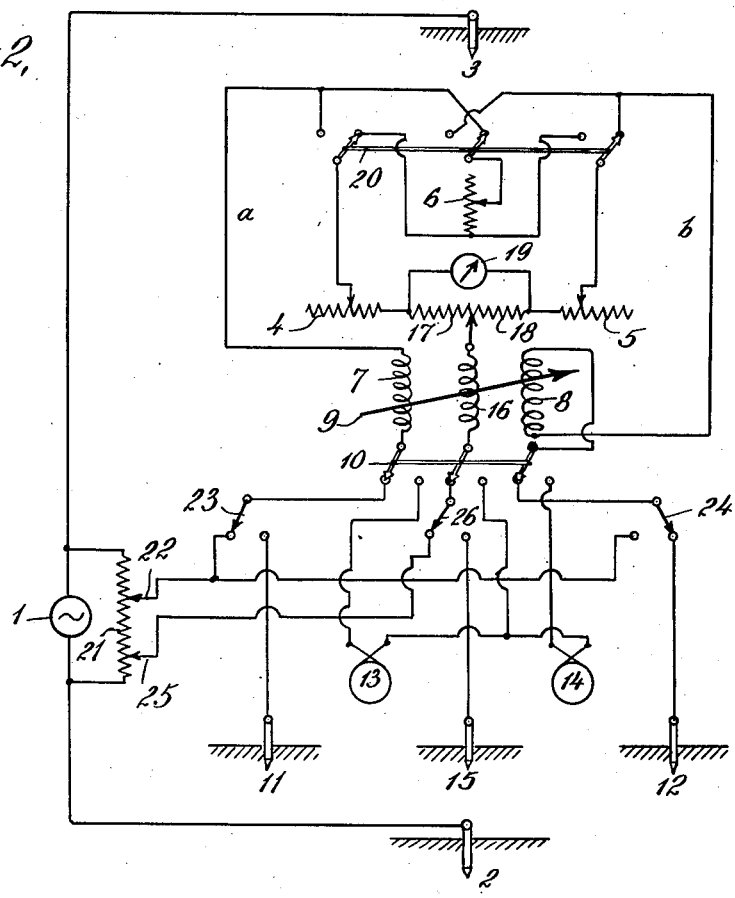
Fig. 2 is a diagrammatic representation of a modified form of apparatus adapted for the practice of the invention.

Referring to the modified form of apparatus shown in Fig. 2, it will be noted that the current source 1 is shunted by a potentiometer 21; a sliding contact arm 22 of which is connected to a pole of a single-pole double-throw switch 23. The other pole of the switch is connected to the end potential electrode 11.

The sliding contact arm 22 also connects with a pole of a single-pole double-throw switch 24, the other pole of which is connected with the end potential electrode 12.

In operating the apparatus, the single-pole double-throw switches 23 and 24 are so thrown that the sliding contact arm 22 connects either with end potential electrode 11 or end potential electrode 12. The two potential electrodes 11 and 12 should not simultaneously be connected with the potentiometer 21 when making observations on a tract under investigation.

A further sliding contact arm 25 on the potentiometer connects with a pole of a single-pole double-throw switch 26, the other pole of which is connected to the center or auxiliary potential electrode 15. This arrangement may be used alone, or in combination with either electrode 11 or 12 in the apparatus just described above.

In the arrangement shown in Fig. 2, it will be noted that sliding contact arm 22, or the end potential electrode 11, may be connected in series with stator 7 of the variometer 9. The sliding contact arm 22, or the end potential electrode 12, may be connected in series to the reversed stator 8 of the variometer. Furthermore, sliding contact arm 25, or the center potential electrode 15, may be connected in series with rotor 16 of the variometer.

In the apparatus shown in Figs. 1 and 2, it will be noted that the center potential electrode 15 is placed relatively closely to power electrode 2, so that it may fall within its influence. The object is to avoid complications arising when the potential electrodes are placed also within the direct influence of the other power electrode. The end potential electrodes 11 and 12 are suitably and symmetrically spaced from both the center potential electrode 15 and the power electrode 2, so that the potential at the center electrode may be higher than that at the end electrodes. When the electrodes are placed in such relative positions, current will flow from the center electrode 15 to the end electrodes 11 and 12.

As indicated above, the three potential electrodes may be so placed relative to one of the exciter or power electrodes that the center or reference potential electrode will have a potential drop lower than that of the two end potential electrodes. In such a case, current will flow from the end potential electrode to the center potential electrode.

Under the operating conditions just outlined, it will be apparent that whether the center potential electrode has the highest or the lowest potential drop, the current flowing through the circuits $a$ and $b$ will always be in opposite directions. In the present preferred practice of the invention, it is aimed to place the center potential electrode in such relation with respect to the power electrode 2 and the end potential electrodes 11 and 12, that it will have the higher potential drop. Current then flows from the center potential electrode 15 to the two end potential electrodes 11 and 12, in opposite directions.

When the currents are made to flow through the two parallel circuits $a$ and $b$ in opposite directions, they will normally be of unequal strength and will therefore cause different potential drops across the identical resistances 17 and 18. This difference will be indicated in the current responsive means 19. If resistances 4 or 5, or 6, and the rotor 16 of the variometer 9 are suitably adjusted, the deflection in the current responsive means may be properly neutralized; thus indicating that the potential drops across the resistances 17 and 18 are equal, or that the current flowing through these resistances are identical.

During the investigation of a section of a tract, the apparatus above described may be operated as follows: resistances 4 and 5 are set at arbitrary values. The potential drop between electrodes 11 and 15 causes a flow of current in the circuit $a$; and the potential drop between electrodes 15 and 12 causes the flow of current in the circuit $b$. By properly adjusting the resistance 6, if necessary, and the rotor 16 of the variometer 9, the resistances of the circuits $a$ and $b$ may be so balanced that the same current flows in both of these circuits in opposite directions. The currents responsive means 19 will of course indicate when the balanced condition has been obtained. When this balanced condition is obtained, the ratio between the values of the resistances 4 and 5 are indicative of the ratio between the ground potentials under investigation, as will be more fully explained below.

The distance between the electrodes, including both the power electrodes and the potential electrodes, or other equivalent pick-up means, may be chosen arbitrarily. In the present preferred practice of the invention, the center potential electrode is placed primarily within the influence of only one of the power electrodes, say electrode 2, and in a line between the two power electrodes, as indicated in the drawings. The two end electrodes 11 and 12 may be arbitrarily located away from the center potential electrode 15. In the present preferred practice of the invention, the three potential electrodes are placed substantially in a straight line with respect to one another. Moreover, the end electrodes are preferably symmetrically spaced with respect to the center electrode.

In order to make a potential drop ratio determination for the potential drops between electrodes 15 and 11 and between electrodes 15 and 12, which may for convenience be designated as $V_{15-11}$ and $V_{15-12}$, the potential electrodes 11, 15 and 12 are connected to the compensating network by means of the triple-pole double-throw switch 10, as shown. When the resistances 4 and 5 are set at arbitrary values, a noticeable deviation of the zero indicator 19 is generally produced. This deviation may be neutralized by appropriate manipulation of the sliding contact arm on the variable resistance 6, if necessary, and of the rotor 16 of the variometer 9. The resistance values are then noted.

The following equations may be considered as representing voltage conditions when no current flows through the indicator 19; that is, when a balanced condition has been obtained:

(1) $V_{15-11} = i(R_{11}+Z_7+R_6+R_4+R_{17}+ 2(Z_{16}+R_{15})+2j2\pi fm)$ (2) $V_{15-12} = i(R_{12}+Z_8+R_5+R_{18}+ 2(Z_{16}+R_{15})-2j2\pi fm)$

Where $V_{15-11}$ = the potential drop between the points 15 and 11;
$V_{15-12}$ = the potential drop between the points 15 and 12;
$i$ = the net-work current flowing through electrode 11 or electrode 12;
$R$ = the index resistance of the apparatus elements indicated by the index numeral.
$Z$ = the index impedance of the apparatus elements indicated by the index numeral.
$m$ = the mutual inductance between the rotor and stators;
$f$ = the frequency of the current source; and
$j$ and $\pi$ = two well known mathematical symbols.

Now, changing the setting of resistance 4 (or 5) and re-establishing neutralization by resetting resistance 5 (or 4), and rotor 16 until no current flows through the indicator 19, without touching any of the other adjustments, we have the following equation for voltage conditions:

(3) $V_{15-11} = i'(R_{11}+Z_7+R_6+R'_4+R_{17}+ 2(Z_{16}+R_{15})+2j2\pi fm')$ (4) $V_{15-12} = i'(R_{12}+Z_8+R'_5+R_{18}+ 2(Z_{16}+R_{15})-2j2\pi fm')$

Dividing Equation (1) by Equation (2) and Equation (3) by Equation (4), the following two equations may be obtained for the center branch resistance:

$$(5) \quad 2(Z_{16}+R_{15}) = \frac{(R_{11}+Z_7+R_6+R_4+R_{17}+2j2\pi fm) - \frac{V_{15-11}}{V_{15-12}}(R_{12}+Z_8+R_5+R_{18}-2j2\pi fm)}{\frac{V_{15-11}}{V_{15-12}}-1}$$

$$(6) \quad 2(Z_{16}+R_{15}) = \frac{(R_{11}+Z_7+R_6+R'_4+R_{17}+2j2\pi fm') - \frac{V_{15-11}}{V_{15-12}}(R_{12}+Z_8+R'_5+R_{18}-2j2\pi fm')}{\frac{V_{15-11}}{V_{15-12}}-1}$$

If Equations (5) and (6) are now combined, the following complex equation potential may be obtained for the potential drop ratio:

$$(7) \quad \frac{V_{15-11}}{V_{15-12}} = \frac{R'_4 - R_4 + j4\pi f(m'-m)}{R'_5 - R_5 - j4\pi f(m'-m)}$$

Excepting under unusual operating conditions, the factor containing the mutual inductance difference $(m'-m)$ is very small compared with the resistance difference $(R'_4-R_4)$ and $(R'_5-R_5)$, and may be neglected without causing an appreciable error. The final result is then given by the simplified equation.

$$(8) \quad \frac{V_{15-11}}{V_{15-12}} = \frac{R'_4 - R_4}{R'_5 - R_5}$$

This relation is extremely simple and contains only the resistance values essential for the computation of the potential drop ratio.

If for any reason it is desired to use the complete Equation (7) for the determination of the potential drop ratio, then this may be easily done by transforming equation (7) into an expression suitable for numerical computation, which can easily be done by anyone skilled in the art. However, as stated, Equation (8) is much more satisfactory for practical purposes and hardly less reliable.

The above explained derivation of potential drop ratios may be carried out with a ground field of either direct or alternating current. When direct current is employed, it is not necessary to change the position of the variometer 9 to balance the constants of the circuits $a$ and $b$, the balancing being effected by the use of the resistances only. The type of indicating instrument 19 employed will depend upon the ground field current, a galvanometer or ammeter being used with direct current ground fields.

The same procedure is used for the determination of electromagnetic field strength ratios, the compensating net-work then being connected to receiving coils 13 and 14 by suitably moving the switch 10. In this case, alternating current is employed, since direct current is not applicable with pick-up coils. If $H_{13}$ and $H_{14}$ are field strengths inducing the electromotive forces $E_{15}$ and $E_{14}$ in the coils for certain positions of the pick-up coils 13 and 14, then we have the following ratio:

$$(9) \quad \frac{H_{13}}{H_{14}} = \frac{E_{13}}{E_{14}}$$

which may numerically be determined by Equation (7) or (8).

The sensitivity of the apparatus may be considerably increased if deemed desirable by employing suitable and well known means to amplify the current imput to the indicator 19.

In order to carry out geophysical investigations, the electrode arrangement 2, 11, 15 and 12 may either be moved as a unit over the area to be investigated and readings taken at different points, or the potential electrodes 11, 15 and 12 may be moved independently in any desired direction; the same of course being true of the pick-up coil arrangement 13 and 14. In the present preferred practice of the invention, the conductive net-work including the pick-up means is moved from point to point within the influence of exciter electrode 2. A series of readings are advantageously taken for each grounded position of power electrode 2 by moving the potential electrodes 11, 15 and 12 from position to position, the center electrode 15 being preferably in line between power electrodes 2 and 3. Any suitable arbitrary arrangement of electrodes may, however, be employed, so long as the center electrode is made to have a potential higher or lower than the two other potential electrodes.

Various modifications of the practice of the invention are diagrammatically shown in Fig. 2. As indicated above, the center potential electrode 15 is employed solely for the purpose of furnishing a reference potential drop $V_{15}$. The same effect is obtained when using the contact arm 25 potential drop $V_{25}$ as the reference potential, provided the sliding contact arm 25 is adjusted to a suitable potential value; and the single-pole double-throw switch 26 is moved to cut out center potential electrode 15. The compensating or balancing procedure with respect to the currents set up in the parallel circuits $a$ and $b$ of the conductive net-work and the computation of the resulting potential drop ratio $$\frac{V_{25-11}}{V_{25-12}}$$

is identical with the procedure and computation described for the potential drop ratio.

$$\frac{V_{15-11}}{V_{15-12}}$$

In a similar manner, either potential electrode 11 or potential electrode 12 may be replaced by an artificial potential, obtained as shown in Fig. 2 by means of sliding contact arm 25 on the potentiometer 21. In that case single-pole double-throw switch 23 or 24 is moved to cut out one of the electrodes and to make connection between its circuit in the compensating net-work and the potentiometer 21. If the contact arm 22 is adjusted to a suitable potential drop value, then the comparison and computation procedures are identical with those just outlined with respect to cutting out the center potential electrode 15.

Such an arrangement has the advantage that it reduces to a minimum the number of potential electrodes required, and the ground potentials may be compared with an artificial standard potential drop. On the other hand, the sensitivity of such an arrangement is necessarily reduced compared with the two or three potential electrode arrangement described above.

Figure 3:
Fig. 3 is a diagrammatic curve indicating results obtainable when investigating an area containing a conductive ore body or the like with apparatus shown in Figs. 1 and 2.

Fig. 3 represents schematically the reciprocal ratios $$\frac{V_{15-11}}{V_{15-12}}$$

obtainable when moving a fixed electrode arrangement over an area or tract to be investigated, the center potential electrode being symmetrically placed in a substantially straight line from the two end electrodes 11 and 12, and the center electrode 15 having a higher potential drop than either of the end potential electrodes. In this manner, each successive measurement will always be comparable because each succeeding determination is made from the same electrode distance arrangement. Using this electrode distance for successive tracts of substantially equal resistance, the ratio values are relatively small and uniform, and increase considerably above a better conductor.

Assuming that the ground contains a highly conductive ore body 27 and that the potential drop ratio profile crosses the ore body at substantially right angles in the direction of the arrow 28, then the resulting potential drop ratio determined while approaching and crossing the better conducting ore body will change in the manner diagrammatically illustrated by the curve 29. The electrical indications obtained by this arrangement are symmetrically located with reference to the actual location of the better conducting body, thereby permitting an accurate determination of its location.

Each point on the curve 29 represents a potential drop ratio determination with respect to the center potential electrode 15, as the exciter and pick-up devices are progressively moved over the tract. When the center potential electrode 15 is grounded in the immediate neighborhood of the ore body 27, the crest of the curve reaches an apex. As the center electrode is grounded over the top or tip of the ore body, the curve drops sharply as indicated. On the other hand, when the center electrode is grounded slightly beyond the ore body, the curve again reaches an apex. As the center electrode, together with the two end potential electrodes, always symmetrically spaced by the same distance, are progressively moved away from the ore body, the curve again flattens out.

I claim:

1. Apparatus for electrical prospecting comprising a detached field excitation device for setting up an electric ground field, a compensating net-work associated but not connected with said excitation device and including two circuits in parallel each of which is provided with at least one variable resistance, and two electrically identical resistances connected in series with said variable resistances.

2. Apparatus for electrical prospecting according to claim 1, in which the compensating net-work includes two spaced pick-up coils, one of said pick-up coils being placed in opposition to the other coil so that current induced in the coils from the ground field may flow in opposite directions.

3. Apparatus for electrical prospecting according to claim 1, in which the compensating net-work includes non-inductive variable resistances connected in series with each other and with the stators of a variometer.

4. Apparatus for electrical prospecting according to claim 1, in which the compensating net-work includes non-inductive variable resistances connected in series with each other and with the stators of a variometer, the free ends of the stators being connected to pick-up means.

5. Apparatus for electrical prospecting according to claim 1, in which the compensating net-work includes a plurality of non-inductive variable resistances connected in series with each other and with the stators of a variometer, the stators being in reverse position one to the other.

6. Apparatus for electrical prospecting according to claim 1, in which the compensating net-work includes a plurality of non-inductive variable resistances connected in series with each other and with the stators of a variometer, the stators being in reverse position one to the other, and potential electrodes connectible with the free ends of the stator.

7. Apparatus for electrical prospecting according to claim 1, in which the compensating net-work includes a plurality of non-inductive variable resistances connected in series with each other and with the stators of a variometer, the stators being in reverse position one to the other, two end potenial electrodes connectible with the free ends of the stator, and a third potential electrode connectible with the rotor of the variometer.

8. Apparatus for electrical prospecting according to claim 1, in which the compensating net-work includes a plurality of non-inductive variable resistances connected in series with each other and with the stators of a variometer, the stators being in reverse position one to the other, two end potenial electrodes connectible with the free ends of the stator, and a third potential electrode connectible with the rotor of the variometer, said rotor also being connected in series to a common point of two electrically identical resistances.

9. Apparatus for electrical prospecting comprising a field excitation device for setting up an electric ground field, a compensating net-work associated but not connected with said excitation device and including two circuits in parallel each of which is provided with at least one variable resistance, and two electrically identical resistances connected in series with said variable resistances, the field excitation device including two spaced and grounded power electrodes connected to a source of current supply, and the compensating net-work including three spaced and grounded potential electrodes.

10. Apparatus for electrical prospecting according to claim 9, in which one of the potential electrodes connects with a branch common to the two circuits in parallel.

11. Apparatus for electrical prospecting according to claim 9, in which one of the potential electrodes connects with a branch common to the two circuits in parallel, said electrode being so placed with respect to the power electrodes that it will have a potential substantially different from that at the other two potential electrodes.

12. Apparatus for electrical prospecting according to claim 9, in which one of the potential electrodes connects with a branch common to the two circuits in parallel, said potential electrode being placed at a distance from one of said power electrodes different from the distances of the other two potential electrodes from the same power electrode.

13. Apparatus for electrical prospecting comprising a compensating net-work associated but not connected with said excitation device and including two circuits in parallel each of which is provided with at least one variable resistance, and two electrically identical resistances connected in series with said variable resistances.

14. Apparatus for electrical prospecting according to claim 13, in which the compensating net-work includes three spaced and grounded potential electrodes.

15. Apparatus for electrical prospecting according to claim 13, in which the compensating net-work includes two spaced pick-up coils, one of said pick-up coils being placed in opposition to the other coil so that current induced in the coils from the ground field may flow in opposite directions.

16. Apparatus for electrical prospecting according to claim 13, in which the compensating net-work includes pick-up means by which a current may be picked up from an electric ground field and passed through the two circuits in parallel.

17. Apparatus for electrical prospecting according to claim 13, in which the compensating net-work includes non-inductive variable resistances connected in series with each other and with the stators of a variometer.

18. Apparatus for electrical prospecting according to claim 13, in which the compensating net-work includes non-inductive variable resistances connected in series with each other and with the stators of a variometer, the free ends of the stators being connected to pick-up means.

19. Apparatus for electrical prospecting according to claim 13, in which the compensating net-work includes a plurality of non-inductive variable resistances connected in series with each other and with the stators of a variometer, the stators being in reverse position one to the other.

20. Apparatus for electrical prospecting according to claim 13, in which the compensating net-work includes a plurality of non-inductive variable resistances connected in series with each other and with the stators of a variometer, the stators being in reverse position one to the other, and potenial electrodes connectible with the free ends of the stator.

21. Apparatus for electrical prospecting according to claim 13, in which the compensating net-work includes a plurality of non-inductive variable resistances connected in series with each other and with the stators of a variometer, the stators being in reverse position one to the other, two end potenial electrodes connectible with the free ends of the stator, and a third potential electrode connectible with the rotor of the variometer.

22. Apparatus for electrical prospecting according to claim 13, in which the compensating net-work includes a plurality of non-inductive variable resistances connected in series with each other and with the stators of a variometer, the stators being in reverse position one to the other, two end potential electrodes connectible with the free ends of the stator, and a third potential electrode connectible with the rotor of the variometer, said rotor also being connected in series to a common point of two electrically identical resistances.

23. Apparatus for electrical prospecting according to claim 13, in which the compensating net-work includes three spaced and grounded potential electrodes, one of the potential electrodes connecting with a branch common to the two circuits in parallel.

24. An exploration apparatus for electrical prospecting comprising a compensating net-work including two circuits in parallel each of which is provided with at least one variable resistance, and two electrically identical resistances connected in series with said variable resistance, a third variable resistance, and switching means whereby said third variable resistance may be connected in series with either parallel circuit.

THEODOR ZUSCHLAG.